3,108,981
POLYETHYLENE COMPOSITIONS
Clayton F. Clark, Saxonville, Mass., and Robert W. Hill, Leawood, Kans., assignors to Spencer Chemical Company, Kansas City, Mo., a corporation of Missouri
No Drawing. Original application June 18, 1958, Ser. No. 742,755, now Patent No. 2,991,265, dated July 9, 1961. Divided and this application Aug. 30, 1960, Ser. No. 52,784
5 Claims. (Cl. 260—32.6)

This invention relates to plastic compositions and, more specifically, to novel polyethylenes of enhanced slip characteristics.

This application is a divisional of our copending application Serial No. 742,755, filed June 18, 1958, now Patent No. 2,991,265.

Polyethylene is one of the most popular and well known thermoplastics of this plastic age. The number of varied uses increases spectacularly each year; many of these include the utilization of polyethylene films. Polyethylene film is being used to package a wide and varied list of commercial commodities such as foods, meats, chemicals, pharmaceuticals, seeds, clothing, hardware and toys. One of the more important properties associated with polyethylene film is its "slip" or film-to-film coefficient of friction. "Slip," as it is known to the trade, relates to the resistance of the film to a sliding action over another film surface or over a metal surface, as manifested by the thin sheets of blown film sticking to one another. Poor "slip" characteristics of polyethylene film are especially troublesome to users of automatic packaging equipment. Poor "slip" is a greater problem with blown film, which is usually thinner than extruded sheets, although there are also many applications of sheets in which an improved "slip" is also advantageous.

The object of this invention is to provide plastic compositions having an improved "slip" or low film-to-film coefficient of friction. A further object of this invention is to provide polyethylene compositions which, upon conversion to sheets or films, have an improved "slip." A still further object of this invention is to provide polyethylene films or sheets possessing improved "slip" characteristics.

There is provided by this invention novel plastic compositions comprising polyethylene containing a small amount of an additive which enhances the slip of the polyethylene. The additives which have been found to enhance or improve the slip of polyethylene when incorporated therein are the N-monosubstituted derivatives of oleamide in which the N-monosubstituent is a long chain saturated aliphatic group, such as higher alkyl groups of 12 to 18 carbons and particularly the alkyl groups having 12 to 18 even numbered carbons. The alkyl is advisably a straight chain. Furthermore, the additive should have a melting point of less than 69° C. Some particular compounds within this group that might be named, and which are good polyethylene "slip" additives, are N-(n-dodecyl)oleamide, N-(n-myristyl)oleamide, N-(n-palmityl)oleamide and N-(n-octadecyl)oleamide.

Additives of the described types are solids at room temperature, insoluble in water and soluble in most hot hydrocarbons. These compounds are readily prepared by conventional processes such as by heating the appropriate fatty acid with the appropriate amine at about 230° C. for about 0.5 to 1 hour under an atmosphere of nitrogen. The product is recovered from the reaction mixture by the usual procedures.

The incorporation of a small amount of one or more of the described additives in polyethylene greatly reduces the polyethylene coefficient of friction. Polyethylene films and sheets and other products made from polyethylene containing a small amount of an additive possess improved "slip" characteristics.

Incorporation of the additive in the polyethylene may be effected by several different methods. For example, the additive may be added as a solid, in solution or in the form of a slurry to polyethylene in either the molding power or pellet form followed by tumbling and drying. The additive may also be incorporated by melt blending the ingredients in a conventional apparatus, such as a banbury mixer, heated rolls or a plasticater.

Additives of the described types are effective slip agents when incorporated in polyethylene to give a polyethylene composition containing about 0.01% to about 1% by weight of the additive. The preferred composition is about 0.05% to about 0.2% by weight of additive in polyethylene. Although more than 1% of additive may be incorporated in polyethylene, larger amounts would not generally be warranted.

It is to be understood that minor amounts of other desirable materials, such as high melting waxes, antioxidants, dyes and pigments, lubricants, antistatic agents, and the like, may also be present in amounts which do not affect the high "slip" properties of these polyethylene compositions.

The described additives are effective in improving the "slip" characteristics of all types of polyethylene, whether they be the more linear polyethylenes prepared by the "low pressure process," the conventional high pressure process polyethylenes of a lower density or the medium density polyethylenes.

Although polyethylene containing one or more of the described additives is particularly useful for improving the slip of products fabricated by extrusion into thin films, sheets, blown tubing, and the like, it may also be cast or molded into films, sheets, rods, tubes and piping, filaments, and other shaped articles, having better slip than similar products made of polyethylene containing no additive. In this regard, molded articles such as cups which tend to stick together when "nested" are more readily separated when the polyethylene contains at least one of the described additives. The polyethylene compositions of this invention may also be used for coating paper, cloth, wire, metal foil, glass fiber mats and synthetic and natural textiles where good slip is desired.

Polyethylene to which at least one of the additives is added has improved blocking properties, that is, film made from such polyethylene has much less tendency to block than an identical polyethylene containing no additive.

The following example illustrates the improved effect of the additives on the "slip" of polyethylene sheet.

*Example 1*

Various additives of the described group were introduced singly into a commercial "high pressure process" type polyethylene having a density of 0.92 and melt index of 2 by introducing the additives into a commercial type banbury and banburying for 10 minutes at 190° F. The polyethylene was then sheeted on a roll mill, ground on a Wiley mill and screened through a screen having 4 mm. openings and extruded into flat film on a 1-inch extruder equipped with a 6-inch flat film die. The film was aged by suspending in air at room temperature for at least 24 hours. The film was evaluated for slip by means of an inclined plane method, which consisted of stretching the film on an adjustable plane. A metal sled weighing 95 grams was placed on the film and one end of the plane then raised until the sled began to slide. The slope of the plane at this point, expressed in degrees, was reported as the slip of the additive. The following results were obtained:

Table

| Additive | Formula | Slip Angle at Conc. of— | | | | |
|---|---|---|---|---|---|---|
| | | 0.02% | 0.05% | 0.10% | 0.15% | 0.5% |
| N-(n-dodecyl) oleamide | $C_{17}H_{33}\overset{O}{\overset{\|}{C}}-NH-(CH_2)_{11}CH_3$ | 27° | 21° | 15° | 12° | 7° |
| N-(n-myristyl) oleamide | $C_{17}H_{33}\overset{O}{\overset{\|}{C}}-NH-(CH_2)_{13}CH_3$ | -------- | 28° | -------- | -------- | -------- |
| N-(n-palmityl) oleamide | $C_{17}H_{33}\overset{O}{\overset{\|}{C}}-NH-(CH_2)_{15}CH_3$ | -------- | 24° | -------- | -------- | -------- |
| N-(n-octadecyl) oleamide | $C_{17}H_{33}\overset{O}{\overset{\|}{C}}-NH-(CH_2)_{17}CH_3$ | -------- | 18° | -------- | -------- | -------- |
| Control (no additive) >36°. | | | | | | |

The results clearly show the improved "slip" characteristics of the polyethylene-additive compositions. The control containing no additive required an angle much higher than the polyethylene-additive compositions in order to cause the sled to slide. We have found that polyethylene compositions which have a low film-to-metal coefficient of friction will also have a comparably low film-to-film coefficient of friction.

Various changes and modifications of the invention can be made and, to the extent that such variations incorporate the spirit of this invention, they are intended to be included within the scope of the appended claims.

What is claimed is:
1. A plastic composition comprising polyethylene and from 0.01% to 1.0% by weight of N-(n-dodecyl)oleamide.
2. A plastic composition comprising polyethylene and from 0.01% to 1.0% by weight of N-(n-myristyl)oleamide.
3. A plastic composition comprising polyethylene and from 0.01% to 1.0% by weight of N-(n-palmityl)oleamide.
4. A plastic composition comprising polyethylene and from 0.01% to 1.0% by weight of N-(n-octadecyl)oleamide.
5. A plastic composition comprising polyethylene and 0.01% to 1.0% by weight of an N-monoalkyl oleamide, said alkyl group having 12 to 18 carbons and said N-monoalkyl oleamide having a melting point of less than 69° C.

References Cited in the file of this patent

FOREIGN PATENTS 1,132,791    France _____ Nov. 5, 1956